(12) United States Patent
Liu (10) Patent No.: US 12,124,517 B2
(45) Date of Patent: Oct. 22, 2024

(54) METHOD FOR DATA EXTRACTION, TERMINAL DEVICE AND COMPUTER-READABLE STORAGE MEDIUM

(71) Applicant: SHENZHEN TINYSOFT CO., LTD., Shenzhen (CN)

(72) Inventor: Ermou Liu, Shenzhen (CN)

(73) Assignee: SHENZHEN TINYSOFT CO., LTD., Guangdong (CN)

( * ) Notice: Subject to any disclaimer, the term of this patent is extended or adjusted under 35 U.S.C. 154(b) by 253 days.

(21) Appl. No.: 17/436,921

(22) PCT Filed: Mar. 5, 2019

(86) PCT No.: PCT/CN2019/076990
§ 371 (c)(1),
(2) Date: Sep. 7, 2021

(87) PCT Pub. No.: WO2020/177074
PCT Pub. Date: Sep. 10, 2020

(65) Prior Publication Data
US 2022/0129503 A1 Apr. 28, 2022

(51) Int. Cl.
*G06F 16/2453* (2019.01)
*G06F 16/906* (2019.01)
(52) U.S. Cl.
CPC ...... *G06F 16/906* (2019.01); *G06F 16/24537* (2019.01)
(58) Field of Classification Search
CPC ............. G06F 16/906; G06F 16/24537; G06F 16/244; G06F 17/00
See application file for complete search history.

(56) References Cited

U.S. PATENT DOCUMENTS 6,047,280 A * 4/2000 Ashby ................... G01C 21/26
701/538
6,085,189 A 7/2000 Pirahesh et al.
(Continued)

FOREIGN PATENT DOCUMENTS

CN 101427249 A 5/2009
CN 103678609 A 3/2014
(Continued)

OTHER PUBLICATIONS

English Translation to International Search Report for Application No. PCT/CN2019/076990.
(Continued)

*Primary Examiner* — Irete F Ehichioya
*Assistant Examiner* — Xiaoqin Hu
(74) *Attorney, Agent, or Firm* — CANTOR COLBURN LLP (57) ABSTRACT

The present application relates to the technical field of data extraction, and provides a method for data extraction, a terminal device, and a computer-readable storage medium. The method for data extraction determines the target cursor from the ordered cursor group based on the quoted keywords contained in the target instruction when the target instruction for extracting target data from the data set is detected and the cursor group in the data set is the ordered cursor group, and then extracts the target data from the data set based on the target instruction and the target cursor, which provides a basis for the movement extraction or movement processing of sequence data, without considering the limitations of query rules or structured query logic in the data, and improving the efficiency of data extraction.

8 Claims, 2 Drawing Sheets

(56) References Cited

U.S. PATENT DOCUMENTS

| | | | | |
|---|---|---|---|---|
| 7,797,304 | B2 * | 9/2010 | Muralidhar | G06F 16/40 |
| | | | | 707/809 |
| 8,392,408 | B1 * | 3/2013 | Fuller | G06F 16/335 |
| | | | | 707/715 |

FOREIGN PATENT DOCUMENTS

| | | |
|---|---|---|
| CN | 104504001 A | 4/2015 |
| CN | 107480220 A | 12/2017 |
| CN | 108334408 A | 7/2018 |
| CN | 108334609 A | 7/2018 |

OTHER PUBLICATIONS

English Translation to Written Opinion for Application No. PCT/CN2019/076990.

International Search Report for Application No. PCT/CN2019/076990.

Written Opinion for Application No. PCT/CN2019/076990.

\* cited by examiner

METHOD FOR DATA EXTRACTION, TERMINAL DEVICE AND COMPUTER-READABLE STORAGE MEDIUM

CROSS REFERENCE TO RELATED APPLICATIONS

The present application is National phase of an international application PCT/CN2019/076990, filed on Mar. 5, 2019, the content of which is incorporated herein by reference.

TECHNICAL FIELD

The present application relates to the technical field of data extraction, and more particularly to a method for data extraction, a terminal device, and a computer-readable storage medium.

BACKGROUND

With the development of science and technology, more and more fields need to rely on the collection, processing and analysis of big data in product development or market expansion. At the same time, it is also necessary to build a corresponding database to facilitate the storage and extraction of the data. Structured Query Language (SQL) is a database query and programming language used to access data and to query, update and manage databases. SQL as the most important relational database operating language has the influence exceeding the database field and is also valued and used in other fields. For example, data retrieval in the field of artificial intelligence requires a language that needs to be embedded in SQL, and so on.

The existing databases all use the SQL language for data processing. However when the SQL language is used to extract relative offset data or move calculation processing on the data with the ordered relationship, the SQL language has obvious structural limitations. For example, if you need to query the data corresponding to the previous time of the time column in the current cursor from an ordered cursor group data set with a time column, you need to query all the data for the target data set whose time point is less than the time column of the current cursor, then use the time column sorting from the target data set to find the data corresponding to the cursor with the maximum value of the time column. It can be seen that the existing data extraction solutions cannot flexibly mobilize data with a certain sequence, that is, which cannot quickly and intuitively extract relevant data, and results in low data extraction efficiency.

SUMMARY

The method for data extraction, the terminal device, and the computer-readable storage medium provided by the present application can improve the data extraction efficiency.

In a first aspect of the present application provided with a method for data extraction, which includes:

determining, if a target instruction for extracting target data from a data set is detected and a cursor group in the data set being an ordered cursor group, a target cursor from the ordered cursor group based on quoted keywords contained in the target instruction; and extracting the target data from the data set based on the target instruction and the target cursor.

In a second aspect of the present application provided with a device for data extraction, the device includes:

a determining unit, configured for determining, if a target instruction for extracting target data from a data set is detected and a cursor group in the data set being an ordered cursor group, a target cursor from the ordered cursor group based on quoted keywords contained in the target instruction; and an extraction unit, configured for extracting the target data from the data set based on the target instruction and the target cursor.

In a third aspect of the present application provided with a terminal device, which includes: a memory, a processor, and a computer program stored in the memory and running on the processor, when the processor executes the computer program the steps of the method of the first aspect are implemented.

In a fourth aspect of the present application provided with a computer-readable storage medium storing a computer program, when the computer program is executed by a processor the steps of the method of the first aspect are implemented.

In the embodiments of the present application, when the target instruction for extracting target data from the data set is detected, and the cursor group of the data set is an ordered cursor group, the target cursor is determined from the ordered cursor group based on the quoted keywords contained in the target instruction, and then the target data corresponding to the target cursor is extracted from the data set based on the target instruction and the target cursor, which provides a basis for the movement extraction or movement processing of sequence data, without considering the limitations of the query rules in the data or the structured query logic, the efficiency of data extraction is improved.

DETAILED DESCRIPTION

In the following description, for the purpose of illustration rather than limitation, specific details such as a specific system structure and technology are proposed for a thorough understanding of the embodiments of the present application. However, it should be clear to those skilled in the art that the present application can also be implemented in other embodiments without these specific details. In other cases, detailed descriptions of well-known systems, devices, circuits, and methods are omitted to avoid unnecessary details from obstructing the description of the present application.

In order to illustrate the technical solution described in the present application, specific embodiments are used for description below.

Figure 1:
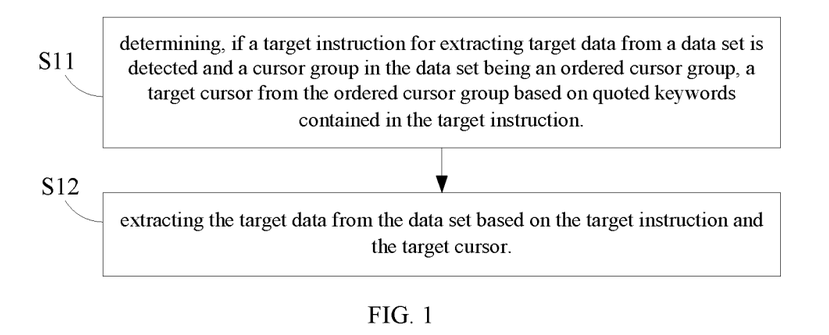
FIG. 1 is a schematic flowchart of an implementation of a method for data extraction provided by an embodiment of the present application.

Referring to FIG. 1, which is an implementation flowchart of a method for data extraction provided by an embodiment of the present application. The execution subject of the method for data extraction in the embodiment can be a client or a server that stores the data set, since the storage of the data set can be in a database, or in the storage space of other forms, the specific storage method of the data set will not be repeated in the embodiment.

The method for data extraction as shown in FIG. 1 includes:

S11: determining, if a target instruction for extracting target data from a data set is detected and a cursor group in the data set being an ordered cursor group, a target cursor from the ordered cursor group based on quoted keywords contained in the target instruction.

In the step S11, the data in the data set is in one-to-one corresponding to the cursors in the cursor group. The ordered cursor group can be obtained by data storage according to a preset storage rule, or it can be obtained by setting a fixed arrangement rule.

In the embodiment, the target instruction may specifically be a data query instruction written in SQL language, which contains quoted keywords for data extraction.

In practical applications, when the target data needs to be extracted from the data set, and the cursor group of the data set is the ordered cursor group, the data extraction can be complete through determining the target cursor of the target data and then querying corresponding data according to the target cursor, the efficiency of data extraction can be improved, and at the same time, the amount of extracted data can be prevented from occupying more operating resources.

S12: extracting the target data from the data set based on the target instruction and the target cursor.

In step S12, since the data in the data set is in one-to-one corresponding to the cursors in the cursor group, that is, each data in the data set corresponds to a cursor. Performing a matching query of the cursor in the target cursor with the cursor of each group of data in the data set, and such that the target data with the same cursor and the target cursor can be extracted from the data set.

It is understandable that since the target data can be queried and extracted through the cursor in the target cursor, thereby when sequence movement extraction or movement calculation is performed on the data, the extraction range of target data can be re-determined by removing or adding different target cursors.

For example, when extracting data from January 1 to January 5, the first group of target cursors can be A, B, C, D, and E. When you need to extract data from January 2 to January 6, the second group of target cursors can be B, C, D, E, and F. The difference between the first group of target cursors and the second group of target cursors lies in the target cursors A and F. Therefore, the target cursor can be determined from the ordered cursor group, which can realize the movement extraction or movement processing of the data.

In the embodiment of the present application, when the target instruction for extracting target data from the data set is detected, and the cursor group of the data set is an ordered cursor group, the target cursor is determined from the ordered cursor group based on the quoted keywords contained in the target instruction, and then the target data corresponding to the target cursor is extracted from the data set based on the target instruction and the target cursor, which provides a basis for the movement extraction or movement processing of sequence data, without considering the limitations of the query rules in the data or the structured query logic, the efficiency of data extraction is improved.

Figure 2:
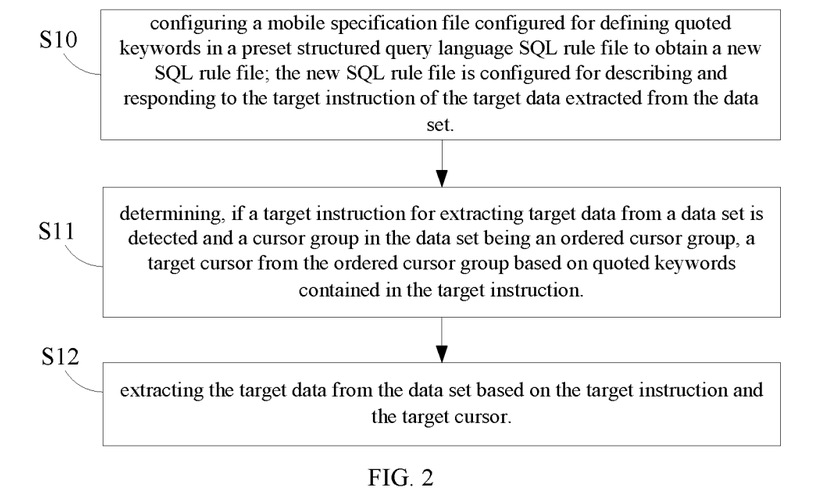
FIG. 2 is a schematic flowchart of an implementation of a method for data extraction provided by another embodiment of the present application.

Referring to FIG. 2, which is a schematic flowchart of a method for data extraction provided by another embodiment of the present application.

The difference between the embodiment and the previous embodiment further includes step S10 before step S11, specifically:

S10: configuring a mobile specification file configured for defining quoted keywords in a preset structured query language SQL rule file to obtain a new SQL rule file; the new SQL rule file is configured for describing and responding to the target instruction of the target data extracted from the data set.

In step S10, the SQL rule file is used to define the usage specification of the query statement. The mobile specification file of the quoted keywords is a protocol file used to describe the extraction rule of the quoted keywords.

In the embodiment, the new SQL rule file defines a preset instruction for extracting target data from the data set, when the preset instruction for extracting target data from the data set is detected, the preset instruction is responded to obtain the cursor group of the data set.

It should be noted that in the embodiment, the new SQL rule file is obtained by configuring the mobile specification file used to define the quoted keywords in the SQL rule file, due that the new aggregate function rule file is used to describe and respond the target instruction of target data extracted from the data set, and when the target instruction for extracting target data from the data set is detected, the target instruction can be responded to extract the target data.

In all the embodiments of the present application, the new SQL rule file is configured with a mobile specification file defining the quoted keywords, and the mobile specification file of the quoted keywords is a protocol file used to describe the extraction rule of the quoted keywords.

Since the new SQL rule file is used to describe and respond to the target instruction of extracting target data from the data set, when the target data needs to be extracted from the data set, by responding to the target instruction containing the quoted keywords, it can realize the operation of extracting target data from the data set.

Further, in the embodiment, the cursor groups in the data set are all ordered cursor groups. It is understandable that in all the embodiments of the present application, since the data in the data set is in one-to-one corresponding to the cursors in the cursor group, when the cursor group is the ordered cursor group, the target cursor can be determined from the ordered cursor group, and then the corresponding target data can be extracted according to the target cursor.

As a specific implementation manner of the embodiment, the step S12 may specifically include: determining position information of the target cursor relative to a current cursor according to the quoted keywords contained in the target instruction, and determining the target cursor from the ordered cursor group according to the position information.

It should be noted that since the existing SQL rule file is not configured with a mobile specification file for defining quoted keywords, thereby when extracting or processing a sequence data set, it is impossible to perform quoting or movement quoting of the target data based on the sequence of the sequence data set. Take the commodity price in a week as a set of sequence data as an example, supposing that on Friday, you want to get the commodity prices of the current day (N) and the previous day (N−1), that is, the commodity prices of Friday and Thursday, it is necessary to traverse the sequence data set and store them separately to realize the data query separately. Specifically, by querying the current maximum number of days (N=5), that is, the commodity price corresponding to Friday, and at the same time querying the commodity price that is one day less than the current maximum number of days (N−1=4), that is, the commodity price corresponding to Thursday. Since the data query process is to sequentially traverse the cursor groups and extract the corresponding data of each cursor group, it is necessary to store the data of the traversed cursor groups, which causes the phenomenon of data redundancy.

In order to solve the phenomenon of data redundancy in the prior art, the new SQL rule file is obtained by configuring the mobile specification file used to define quoted keywords in the SQL rule file, due that the new aggregate function rule file is used for describing and responding the target instruction for extracting target data from the data set, the target instruction contains quoted keywords, the target cursor can be determined from the ordered cursor group based on the position information of the target cursor defined by the quoted keywords relative to the current cursors, and then the target data is extracted, and the data in the data set does not need to sequentially traverse and store, which improves the flexibility of extracting and processing sequence data, and effectively improves the efficiency of data processing.

Taking the quoted keyword Ref as an example, the expression N in Ref (Exp, N) is the position information of the target cursor relative to the current cursor, and Exp is used to define the content of the target data.

For example, to access a data set of a product, the prices of the product in the previous three days can be used in the sentence "Select Price,Ref (Price,3) from PriceTable", where N in Ref (Price,3) is the position information of the target cursor relative to the current cursor, indicating that the cursor of the previous three days is quoted, Exp is the Price, that is, the target data content is the price, which realizes that the SQL sentence has the function of relative quote to the data in the time series.

As another specific implementation manner of the embodiment, the quoted keywords contained in the target instruction are used to limit the number of data samples of the aggregate function.

Further, the step S12 may specifically include: creating, if the target instruction is an instruction to extract the target data based on the aggregate function, a moving window according to the number of data samples and determining the target cursor from the ordered cursor group based on the moving window; and the target cursor comprises a cursor or a cursor group composed of a plurality of cursors.

It should be noted that the aggregate function is a function whose value is a set as input and returns a single value. In SQL, the aggregate function can be: average value avg, sum sum, or count count, etc.

In the prior art, an aggregation function can be used to extract or calculate corresponding data from a data set.

Taking the average value as an example, to obtain the average number of transaction prices from a data set of a product, the sentence "Select average(price) from pricetable" can be used, that is to calculate the average value of all the price data in the entire data set of pricetable. However, in practical applications, when it is necessary to calculate the average value of part of the data in the data set, it cannot be implemented based on the aggregate function.

In order to implement calculations by calling part of the data in the data set in the aggregate function, it is allowed to add quoted keywords used to limit the number of data samples in the aggregate function. Take the example of dynamically obtaining the average value of price data in the past 20 days from the data set of a certain commodity, the sentence "Select average(price,20), from pricetable" can be used, where "20" is the number of the data samples of the aggregate function.

As another specific implementation manner of the embodiment, the quoted keywords contained in the target instruction are used to limit the condition of data samples of the aggregate function.

Further, the step S12 may specifically include: determining, if the target instruction is an instruction to extract the target data based on the aggregate function, the target cursor from the ordered cursor group according to the condition of data samples; wherein the target cursor comprises a cursor or a cursor group composed of a plurality of cursors.

In the prior art, the aggregation function can be used to extract or calculate corresponding data from a data set. Take the average value as an example, to obtain the average number of price data whose transaction price is greater than 100 from the data set of a certain commodity, that is, the average value of all price data whose transaction price is greater than 100, although the sentence "Select average (price) from pricetable where vol>100" can be used, however in actual applications, when the above aggregate function is executed, all data in the data set needs to be polled and compared to obtain the data sample of the aggregate function, so that redundant data will be generated.

In order to eliminate the redundant data generated during the operation of the aggregate function, it is allowed to define the condition of data samples of the aggregate function in the aggregate function. Taking the calculation of the average value of price data whose transaction price is greater than 100 as an example, the sentence "Select average (price,vol>100), from pricetable" can be used, where "vol>100" is the condition of data samples that limits the aggregation function.

In practical applications, since counters in the field know that aggregate functions can be defined or added by themselves according to evaluation requirements, aggregate functions can also be other aggregate functions other than the above-mentioned inherent aggregate functions, and in other aggregate functions, the quoted keywords can also be used to limit the condition information of the target cursor in the aggregate function, which will not be repeated herein.

Figure 3:
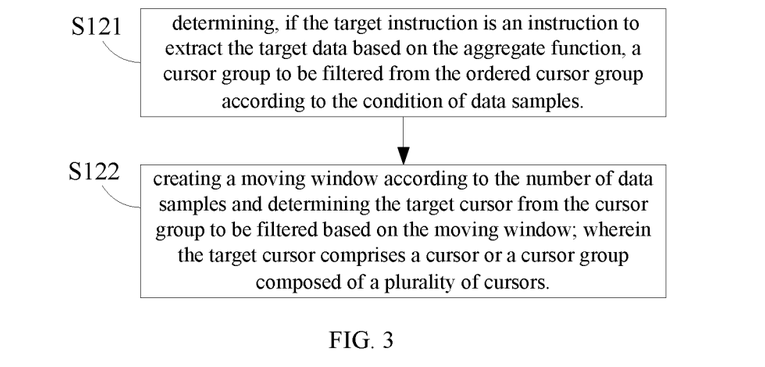
FIG. 3 is a schematic flowchart of an implementation of step S12 in a method for data extraction provided by another embodiment of the present application.

FIG. 3 shows another specific implementation of step S12, the quoted keywords contained in the target instruction are used to limit the condition of data samples and the number of data samples of the aggregate function.

As shown in FIG. 3, the step S12 may specifically include:

S121: determining, if the target instruction is an instruction to extract the target data based on the aggregate function, a cursor group to be filtered from the ordered cursor group according to the condition of data samples.

S122: creating a moving window according to the number of data samples and determining the target cursor from the cursor group to be filtered based on the moving window; wherein the target cursor comprises a cursor or a cursor group composed of a plurality of cursors.

In the embodiment, the quoted keywords define the condition and number of the data samples of the aggregate function, where the condition of data samples is used to distinguish data that can be used as the data sample of the aggregate function from the data set. The cursor group to be filtered is the data that meets the condition of data samples in the data set, and the corresponding cursor set.

It should be noted that the quoted keywords contained in the target instruction also limits the number of data samples of the aggregate function. According to the number of data samples, the moving window can be created. The moving window is used to identify the range of the target cursor, that is, the target cursor is determined from the cursor group to be filtered.

In the prior art, the aggregation function can be used to extract or calculate corresponding data from a data set. Taking the average value as an example, to obtain the average number of price data whose transaction price is greater than 100 from the data set of a certain commodity, that is, the average value of all price data whose transaction price is greater than 100, the sentence "Select average(price) from pricetable where vol>100" can be used. However, in practical applications, when the above aggregate function is executed, all data in the data set needs to be polled and compared to obtain the data sample of the aggregate function, so that redundant data will be generated. In addition, when the data in the data set continues to increase over time, there is interference data in the data set that does not need to be considered, for example, when the transaction price is too low to be difficult to refer to, or the transaction data with too long history has no reference value, using a simple aggregate function cannot eliminate redundant data or interfering data.

In order to simplify the extraction step of the target data, it is allowed to define the condition and number of data samples of the aggregate function in the aggregate function. Taking the dynamic calculation of the average of price data with transaction prices greater than 100 in the last 20 days from the data set of a certain product as an example, the sentence "Select average(price,vol>100,20) from pricetable" can be used, where, "Vol>100" is the definition of the condition of data samples of aggregate function in the aggregate function, and "20" is the definition of the number of data samples of the aggregate function in the aggregate function.

The above rules can solve the cursor groups that meet the specified conditions in the specified number of samples in the mobile aggregation statistics. In practical applications, there is another requirement for moving condition aggregation, that is, the condition is judged from the current cursor forward, and the specified number of samples that meet the condition are obtained as the target cursor group. Specifically, it can be achieved by adding parameters to the quoted keywords, for example, Select average (price,vol>100,20, true) from pricetable satisfies the conditional judgment from the current cursor forward.

In the specific implementation, we can also achieve it through other configuration options and configuration keywords. For example, using Select selectopt(1) average(price, vol>100,20) from pricetable to support the conditional judgment mode from the current cursor forward, Select selectopt (0) average(price,vol>100,20) from pricetable to support the conditional judgment mode from the current cursor backward. In practical applications, since counters in the field know that aggregate functions can be defined or added by themselves according to evaluation requirements, aggregate functions can also be other aggregate functions other than the above-mentioned inherent aggregate functions, in other aggregate functions, the quoted keywords can also be used to limit the condition information of the target cursor in the aggregate function, which will not be repeated herein.

Further, as yet another possible implementation of the embodiment, the quoted keywords contained in the target instruction are configured for pointing to a cursor of statistical data corresponding to a statistical function; and the step S12 may include:

determining, if the target instruction is an instruction to extract the target data based on the statistical function, the statistical data according to the statistical function; and determining the target cursor from the ordered cursor group based on the statistical data; wherein the target cursor includes a cursor or a cursor group composed of a plurality of cursors.

It should be noted that, in the embodiment, the statistical function can be an aggregate function, and is used to determine a function with special meaning data from the data set, that is, the statistical data corresponding to the statistical function is the data in the data set.

In the embodiment, the cursor corresponding to the statistical data is the target cursor, that is, determining the target cursor from the ordered set of cursors based on the statistical data is to identify the cursor corresponding to the statistical data as the target cursor.

In the prior art, statistical functions can be used to extract or calculate corresponding data from a data set. Taking the statistical function to calculate the maximum value Max as an example, to obtain the maximum score from the data set of the scores of all students in a class, the sentence "Select Max(Score) from scoretable" can be used. However, in practical applications, after determining a certain target data in the data set, if the associated data of the target data is required to be obtained, it cannot be obtained based on the result of this calculation. For example, if the maximum score corresponding to the student ID or the name of the student is required to be determined, it cannot be obtained directly based on the maximum score determined this time.

In order to improve the utilization of the calculation result of the statistical function, the calculation result of the statistical function is allowed to be used as a data sample, that is, the calculation result of the statistical function is allowed to be used as a reference for cursor positioning to determine the target cursor. Taking the maximum score from the data set of the scores of all students in a class and the student ID corresponding to the maximum value as an example, the sentence "Select Max(Score), refMax(ID) from scoretable" can be used, where ""refMax(ID)" is the quoted keywords, which points to the calculation result of the statistical function Max(Score).

Further, as a possible implementation of the embodiment, the step S13 may include: determining a target data group according to the target cursor, and extracting the target data from the target data group according to the target data dimension information defined in the target instruction.

In all the embodiments, the data set includes the data groups, and each of the data groups includes at least one dimension information. Taking student performance as an example, all student performances in a class are the data set. In the data set, the performance of each student is composed of student name and student ID and other information to form a data group, the dimensional information can be: subject, gender, etc. The target data dimension information defined in the target instruction is used to determine specific target data from the data group.

It can be seen from the above that the embodiment of the present application configures the mobile specification file used to define the quoted keywords into the structured query language SQL rule file to obtain a new SQL rule file. Due that the new aggregate function rule file is used for describing and responding to the target instruction for extracting target data from a data set, so that when the target instruction is detected and the cursor group of the data set is an ordered cursor group, the target cursor can be determined from the ordered cursor group based on the quoted keywords contained in the target instruction, in turn, extracts the target data corresponding to the target cursor from the data set, which provides a basis for the movement extraction or movement processing of sequence data, without considering the limitations of query rules or structured query logic in the data, and improving the efficiency of data extraction.

Figure 4:
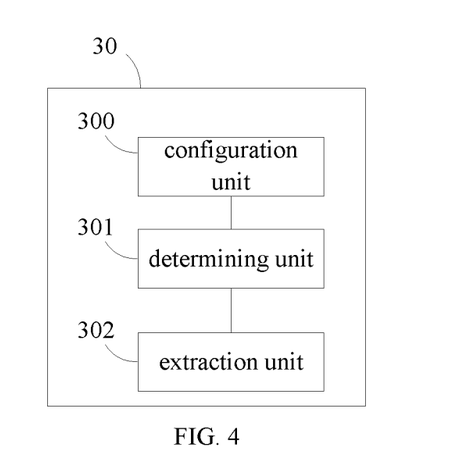
FIG. 4 is a schematic structural diagram of a device for data extraction provided by an embodiment of the present application.

Referring to FIG. 3, which is a schematic block diagram of a device for data extraction provided by an embodiment of the present application.

Each unit included in the device 30 for data extraction of the embodiment is used to execute each step in the embodiment corresponding to FIG. 2. For details, please refer to the related description in the embodiment corresponding to FIG. 2, which will not be repeated herein. The device 30 for data extraction of the embodiment includes: a determining unit 301 and an extraction unit 302, specifically:

The determining unit 301, configured for determining, if a target instruction for extracting target data from a data set is detected and a cursor group in the data set being an ordered cursor group, a target cursor from the ordered cursor group based on quoted keywords contained in the target instruction.

The extraction unit 302, configured for extracting the target data from the data set based on the target instruction and the target cursor.

Further, as a possible implementation of the embodiment, the device 30 for data extraction further includes: a configuration unit 300, configured for configuring a mobile authority file configured for defining quoted keywords in a preset structured query language SQL rule file to obtain a new SQL rule file; the new SQL rule file is configured for describing and responding to the target instruction of the target data extracted from the data set.

Further, as a possible implementation of the embodiment, the determining unit 301 is specifically configured for determining position information of the target cursor relative to a current cursor according to the quoted keywords contained in the target instruction, and determining the target cursor from the ordered cursor group according to the position information.

Further, as a possible implementation of the embodiment, the quoted keywords contained in the target instruction are configured for limiting a number of data samples of an aggregate function; the determining unit 301 is specifically configured for creating, if the target instruction is an instruction to extract the target data based on the aggregate function, a moving window according to the number of data samples and determining the target cursor from the ordered cursor group based on the moving window; and the target cursor comprises a cursor or a cursor group composed of a plurality of cursors.

Further, as a possible implementation of the embodiment, the quoted keywords contained in the target instruction are configured for limiting a condition of data samples of an aggregate function; the determining unit 301 is specifically configured for determining, if the target instruction is an instruction to extract the target data based on the aggregate function, the target cursor from the ordered cursor group according to the condition of data samples; and the target cursor comprises a cursor or a cursor group composed of a plurality of cursors.

Further, as a possible implementation of the embodiment, the quoted keywords contained in the target instruction are configured for limiting a number of data samples and a condition of data samples of an aggregate function; the determining unit 301 is specifically configured for determining, if the target instruction is an instruction to extract the target data based on the aggregate function, a cursor group to be filtered from the ordered cursor group according to the condition of data samples; and creating a moving window according to the number of data samples and determining the target cursor from the cursor group to be filtered based on the moving window; wherein the target cursor comprises a cursor or a cursor group composed of a plurality of cursors.

Further, as a possible implementation of the embodiment, the quoted keywords contained in the target instruction are configured for pointing to a cursor of statistical data corresponding to a statistical function; the determining unit 301 is specifically configured for determining, if the target instruction is an instruction to extract the target data based on the statistical function, the statistical data according to the statistical function; and determining the target cursor from the ordered cursor group based on the statistical data; wherein the target cursor comprises a cursor or a cursor group composed of a plurality of cursors.

Further, as a possible implementation of the embodiment, the extraction unit 302 is specifically configured for determining a target data group according to the target cursor, and extracting the target data from the target data group according to the target data dimensional information defined in the target instruction.

Figure 5:
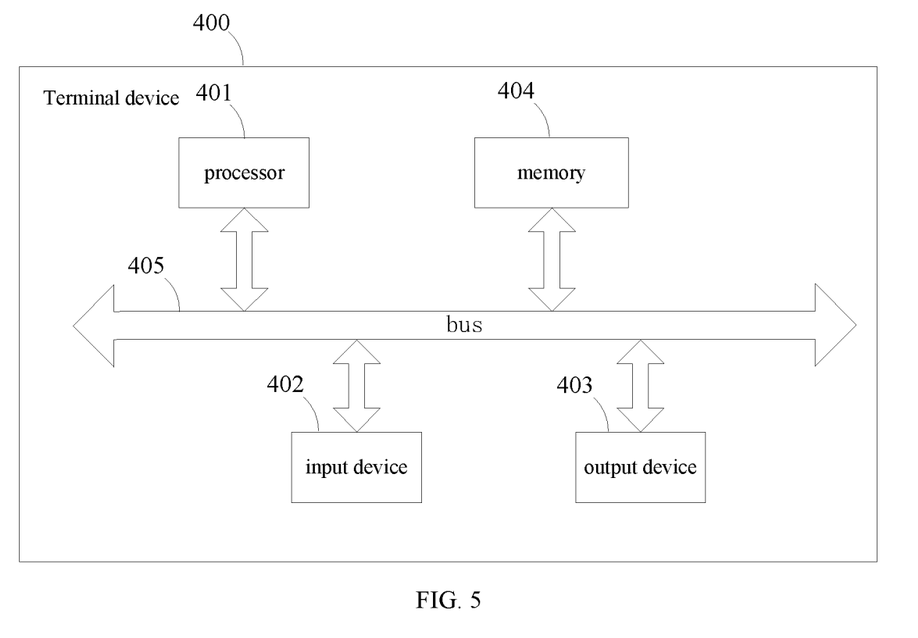
FIG. 5 is schematic diagram of a terminal device provided by an embodiment of the present application.

Referring to FIG. 4, which is a schematic block diagram of a terminal device according to another embodiment of the present application.

The terminal device 400 in the embodiment as shown in the FIG. 4 may include: one or more processors 401; one or more input devices 402, one or more output devices 403, and a memory 404. The aforementioned processor 401, the input device 402, the output device 403, and the memory 404 are connected via a bus 405. The memory 404 is used for storage, the computer program includes instructions, and the processor 401 performs the following operations by extracting the computer program stored in the memory 404:

The processor 401 is configured for: determining, if a target instruction for extracting target data from a data set is detected and a cursor group in the data set being an ordered cursor group, a target cursor from the ordered cursor group based on quoted keywords contained in the target instruction.

The processor 401 is configured for: extracting the target data from the data set based on the target instruction and the target cursor.

As a possible implementation of the embodiment, the processor 401 is further configured for configuring a mobile authority file configured for defining quoted keywords in a preset structured query language SQL rule file to obtain a new SQL rule file; the new SQL rule file is configured for describing and responding to the target instruction of the target data extracted from the data set.

As a possible implementation of the embodiment, the processor 401 is further configured for determining position information of the target cursor relative to a current cursor according to the quoted keywords contained in the target instruction, and determining the target cursor from the ordered cursor group according to the position information.

As a possible implementation of the embodiment, the quoted keywords contained in the target instruction are configured for limiting a number of data samples of an aggregate function; the processor 401 is specifically configured for creating, if the target instruction is an instruction to extract the target data based on the aggregate function, a moving window according to the number of data samples and determining the target cursor from the ordered cursor group based on the moving window; and the target cursor comprises a cursor or a cursor group composed of a plurality of cursors.

As a possible implementation of the embodiment, the quoted keywords contained in the target instruction are configured for limiting a condition of data samples of an aggregate function; the processor 401 is specifically configured for determining, if the target instruction is an instruction to extract the target data based on the aggregate function, the target cursor from the ordered cursor group according to the condition of data samples; and the target cursor comprises a cursor or a cursor group composed of a plurality of cursors.

As a possible implementation of the embodiment, the quoted keywords contained in the target instruction are configured for limiting a number of data samples and a condition of data samples of an aggregate function; the processor 401 is specifically configured for determining, if the target instruction is an instruction to extract the target data based on the aggregate function, a cursor group to be filtered from the ordered cursor group according to the condition of data samples; and creating a moving window according to the number of data samples and determining the target cursor from the cursor group to be filtered based on the moving window; wherein the target cursor comprises a cursor or a cursor group composed of a plurality of cursors.

As a possible implementation of the embodiment, the quoted keywords contained in the target instruction are configured for pointing to a cursor of statistical data corresponding to a statistical function; the processor 401 is specifically configured for determining, if the target instruction is an instruction to extract the target data based on the statistical function, the statistical data according to the statistical function; and determining the target cursor from the ordered cursor group based on the statistical data; wherein the target cursor comprises a cursor or a cursor group composed of a plurality of cursors.

As a possible implementation of the embodiment, the processor 401 is specifically configured for determining a target data group according to the target cursor, and extracting the target data from the target data group according to the target data dimensional information defined in the target instruction.

It should be understood that in the embodiment of the present application, the so-called processor 501 may be a central processing unit (CPU), and the processor may also be other general-purpose processors or digital signal processors (DSP), Application Specific Integrated Circuit (ASIC), Field-Programmable Gate Array (FPGA) or other programmable logic devices, discrete gates or transistor logic devices, discrete hardware components, etc. The general-purpose processor may be a microprocessor or the processor may also be any conventional processor or the like.

The input device 402 may include a touch panel, a fingerprint sensor (used to collect user fingerprint information and fingerprint orientation information), a microphone, etc., and the output device 403 may include a display (LCD, etc.), a speaker, and the like.

The memory 404 may include a read-only memory and a random access memory, and provides instructions and data to the processor 401. A part of the memory 404 may also include a non-volatile random access memory. For example, the memory 404 may also store device type information.

In specific implementation, the processor 401, input device 402, and output device 403 described in the embodiments of the present application can execute the implementation described in the embodiment of the method for data extraction provided in the embodiments of the present application, and can also execute this implementation described in the embodiment of the device, which will not be repeated herein.

In another embodiment of the present application, a computer-readable storage medium is provided, the computer-readable storage medium stores a computer program, and when the computer program is executed by a processor, the following is implemented:

Determining, if a target instruction for extracting target data from a data set is detected and a cursor group in the data set being an ordered cursor group, a target cursor from the ordered cursor group based on quoted keywords contained in the target instruction; and extracting the target data from the data set based on the target instruction and the target cursor.

As a possible implementation of the embodiment, when the computer program is executed by a processor, the following is implemented:

configuring a mobile authority file configured for defining quoted keywords in a preset structured query language SQL rule file to obtain a new SQL rule file; the new SQL rule file is configured for describing and responding to the target instruction of the target data extracted from the data set.

As a possible implementation of the embodiment, when the computer program is executed by a processor, the following is implemented:

determining position information of the target cursor relative to a current cursor according to the quoted keywords contained in the target instruction, and determining the target cursor from the ordered cursor group according to the position information.

As a possible implementation of the embodiment, the quoted keywords contained in the target instruction are configured for limiting a number of data samples of an aggregate function; when the computer program is executed by a processor, the following is implemented:

creating, if the target instruction is an instruction to extract the target data based on the aggregate function, a moving window according to the number of data samples and determining the target cursor from the ordered cursor group based on the moving window; and the target cursor comprises a cursor or a cursor group composed of a plurality of cursors.

As a possible implementation of the embodiment, the quoted keywords contained in the target instruction are configured for limiting a condition of data samples of an aggregate function; when the computer program is executed by a processor, the following is implemented:

determining, if the target instruction is an instruction to extract the target data based on the aggregate function, the target cursor from the ordered cursor group according to the condition of data samples; and the target cursor comprises a cursor or a cursor group composed of a plurality of cursors.

As a possible implementation of the embodiment, the quoted keywords contained in the target instruction are configured for limiting a number of data samples and a condition of data samples of an aggregate function; when the computer program is executed by a processor, the following is implemented:

determining, if the target instruction is an instruction to extract the target data based on the aggregate function, a cursor group to be filtered from the ordered cursor group according to the condition of data samples; and creating a moving window according to the number of data samples and determining the target cursor from the cursor group to be filtered based on the moving window; wherein the target cursor comprises a cursor or a cursor group composed of a plurality of cursors.

As a possible implementation of the embodiment, the quoted keywords contained in the target instruction are configured for pointing to a cursor of statistical data corresponding to a statistical function; when the computer program is executed by a processor, the following is implemented:

determining, if the target instruction is an instruction to extract the target data based on the statistical function, the statistical data according to the statistical function; and determining the target cursor from the ordered cursor group based on the statistical data; wherein the target cursor comprises a cursor or a cursor group composed of a plurality of cursors.

Further, as a possible implementation of the embodiment, when the computer program is executed by a processor, the following is implemented:

determining a target data group according to the target cursor, and extracting the target data from the target data group according to the target data dimensional information defined in the target instruction.

It can be seen from the above that, in the embodiment of the present application, by determining the target cursor from the ordered cursor group based on the quoted keywords contained in the target instruction when the target instruction for extracting target data from the data set is detected and the cursor group in the data set is the ordered cursor group, and then extracting the target data from the data set based on the target instruction and the target cursor, which provides a basis for the movement extraction or movement processing of sequence data, without considering the limitations of query rules or structured query logic in the data, and improving the efficiency of data extraction.

The computer-readable storage medium may be an internal storage unit of the device described in any of the foregoing embodiments, such as a hard disk or memory of a computer. The computer-readable storage medium may also be an external storage device of the device, such as a plug-in hard disk, a smart memory card (SMC), or a Secure Digital (SD) card, and Flash Card, etc. equipped on the device. Further, the computer-readable storage medium may also include both an internal storage unit of the device and an external storage device. The computer-readable storage medium is used to store the computer program and other programs and data required by the device. The computer-readable storage medium can also be used to temporarily store data that has been output or will be output.

In addition, the functional units in the various embodiments of the present application may be integrated into one processing unit, or each unit may exist alone physically, or two or more units may be integrated into one unit. The above-mentioned integrated unit can be implemented in the form of hardware or software functional unit.

When the integrated unit is implemented in the form of a software functional unit and sold or used as an independent product, the integrated unit may be stored in a computer readable storage medium. Based on such understanding, the technical solutions of the present application essentially, or the part contributing to the prior art, or all or a part of the technical solutions may be implemented in the form of a software product. The software product is stored in a storage medium and includes a plurality of instructions for instructing a computer device (which may be a personal computer, a server, a network device, etc.) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

As stated above, the foregoing embodiments are merely used to explain the technical solutions of the present application, and are not intended to limit the technical solutions. Although the present application has been described in detail with reference to the foregoing embodiments, the ordinarily skilled one in the art should understand that the technical solutions described in the foregoing embodiments can still be modified, or equivalent replacement can be made to some of the technical features. Moreover, these modifications or substitutions do not make the essences of corresponding technical solutions depart from the spirit and the scope of the technical solutions of the embodiments of the present application.

What is claimed is:

1. A method for data extraction, comprising:
   configuring a mobile specification file to define quoted keywords in a preset structured query language (SQL) rule file to obtain a new SQL rule file, wherein the mobile specification file describes extraction rules of the quoted keywords and the new SQL rule file is configured to describe and respond to target instructions that extract target data from a data set having a cursor group that is an ordered cursor group, wherein each data in the data set corresponds to a cursor in the cursor group, and the quoted keywords indicate position information of a target cursor relative to a current cursor in the cursor group, or limit a number of data samples of an aggregate function in the target instructions, or limit a condition of data samples of an aggregate function in the target instructions, or limit a number of data samples and a condition of data samples of an aggregate function in the target instructions, or point to a cursor of statistical data corresponding to a statistical function in the target instructions;
   detecting a target instruction for extracting target data from a data set having a cursor group in the data set that is an ordered cursor group and the target instruction contains quoted keywords defined in the new SQL rule file;
   determining a target cursor from the ordered cursor group based on the quoted keywords contained in the target instruction; and
   extracting the target data from the data set based on the target instruction and the target cursor.

2. The method of claim 1, wherein the step of determining the target cursor from the ordered cursor group based on the quoted keywords contained in the target instruction comprises:
   determining position information of the target cursor relative to a current cursor according to the quoted keywords contained in the target instruction, and determining the target cursor from the ordered cursor group according to the position information.

3. The method of claim 1, wherein the quoted keywords contained in the target instruction are configured to limit a number of data samples of an aggregate function in the target instruction; and
   the step of determining the target cursor from the ordered cursor group based on the quoted keywords contained in the target instruction comprises:
   creating a moving window according to the number of data samples and determining the target cursor from the ordered cursor group based on the moving window, wherein the target cursor comprises a cursor or a cursor group composed of a plurality of cursors.

4. The method of claim 1, wherein the quoted keywords contained in the target instruction are configured to limit a condition of data samples of an aggregate function in the target instruction; and the step of determining the target cursor from the ordered cursor group based on the quoted keywords contained in the target instruction comprises:

determining the target cursor from the ordered cursor group according to the condition of data samples, wherein the target cursor comprises a cursor or a cursor group composed of a plurality of cursors.

5. The method of claim 1, wherein the quoted keywords contained in the target instruction are configured to limit a number of data samples and a condition of data samples of an aggregate function in the target instruction; and the step of determining the target cursor from the ordered cursor group based on the quoted keywords contained in the target instruction comprises:

determining a cursor group to be filtered from the ordered cursor group according to the condition of data samples;

creating a moving window according to the number of data samples and determining the target cursor from the cursor group to be filtered based on the moving window, wherein the target cursor comprises a cursor or a cursor group composed of a plurality of cursors.

6. The method of claim 1, wherein the quoted keywords contained in the target instruction are configured to point to a cursor of statistical data corresponding to a statistical function in the target instruction; and the step of determining the target cursor from the ordered cursor group based on the quoted keywords contained in the target instruction comprises:

determining the statistical data according to the statistical function;

determining the target cursor from the ordered cursor group based on the statistical data, wherein the target cursor comprises a cursor or a cursor group composed of a plurality of cursors.

7. A terminal device, comprising: a memory, a processor, and a computer program stored in the memory and running on the processor, wherein the processor is configured to execute following operations:

configuring a mobile specification file to define quoted keywords in a preset structured query language (SQL) rule file to obtain a new SQL rule file, wherein the mobile specification file describes extraction rules of the quoted keywords and the new SQL rule file is configured to describe and respond to target instructions that extract target data from a data set having a cursor group that is an ordered cursor group, wherein each data in the data set corresponds to a cursor in the cursor group, and the quoted keywords indicate position information of a target cursor relative to a current cursor in the cursor group, or limit a number of data samples of an aggregate function in the target instructions, or limit a condition of data samples of an aggregate function in the target instructions, or limit a number of data samples and a condition of data samples of an aggregate function in the target instructions, or point to a cursor of statistical data corresponding to a statistical function in the target instructions;

detecting a target instruction for extracting target data from a data set having a cursor group in the data set that is an ordered cursor group and the target instruction contains quoted keywords defined in the new SQL rule file;

determining a target cursor from the ordered cursor group based on the quoted keywords contained in the target instruction; and extracting the target data from the data set based on the target instruction and the target cursor.

8. A non-transitory computer-readable storage medium storing a computer program, wherein the computer program is executed by a processor to implement the steps as following:

configuring a mobile specification file to define quoted keywords in a preset structured query language (SQL) rule file to obtain a new SQL rule file, wherein the mobile specification file describes extraction rules of the quoted keywords and the new SQL rule file is configured to describe and respond to target instructions that extract target data from a data set having a cursor group that is an ordered cursor group, wherein each data in the data set corresponds to a cursor in the cursor group, and the quoted keywords indicate position information of a target cursor relative to a current cursor in the cursor group, or limit a number of data samples of an aggregate function in the target instructions, or limit a condition of data samples of an aggregate function in the target instructions, or limit a number of data samples and a condition of data samples of an aggregate function in the target instructions, or point to a cursor of statistical data corresponding to a statistical function in the target instructions;

detecting a target instruction for extracting target data from a data set having a cursor group in the data set that is an ordered cursor group and the target instruction contains quoted keywords defined in the new SQL rule file;

determining a target cursor from the ordered cursor group based on the quoted keywords contained in the target instruction; and extracting the target data from the data set based on the target instruction and the target cursor.

* * * * *